United States Patent [19]

Johnson

[11] Patent Number: 4,802,897
[45] Date of Patent: Feb. 7, 1989

[54] RECOVERY OF GASES FROM NON-VISCOUS SOLVENTS

[76] Inventor: Arthur F. Johnson, 240 Fox Dr., Boulder, Colo. 80303

[21] Appl. No.: 893,425

[22] Filed: Aug. 5, 1986

[51] Int. Cl.⁴ .............................................. B01D 19/00
[52] U.S. Cl. .......................................... 55/55; 55/193; 55/191; 55/387; 210/188; 137/136; 137/144
[58] Field of Search ...................... 55/15, 55, 46, 189, 55/190, 191, 192, 193, 387; 210/188; 137/123, 136, 143, 144

[56] References Cited

U.S. PATENT DOCUMENTS

| 580,169 | 4/1897 | Washington | 55/193 |
| 2,195,898 | 4/1940 | Newton | 55/190 |
| 2,570,171 | 10/1951 | Kohorn et al. | 55/193 |
| 4,428,757 | 1/1984 | Hall | 55/15 |

FOREIGN PATENT DOCUMENTS 632797 11/1978 U.S.S.R. ............... 137/123

Primary Examiner—Bernard Nozick
Attorney, Agent, or Firm—Pennie & Edmonds

[57] ABSTRACT

A process and apparatus for separating a volatile gas from a liquid in which it is dissolved. The liquid flows through a conduit having obstructions to cause separation by centripetal forces created as the liquid flows around the obstruction. The gases thus freed are collected on a surface disposed within the flow. The flow is advantageously through a syphon-like device thus reducing the pressure in the liquid to further assist separation.

19 Claims, 5 Drawing Sheets

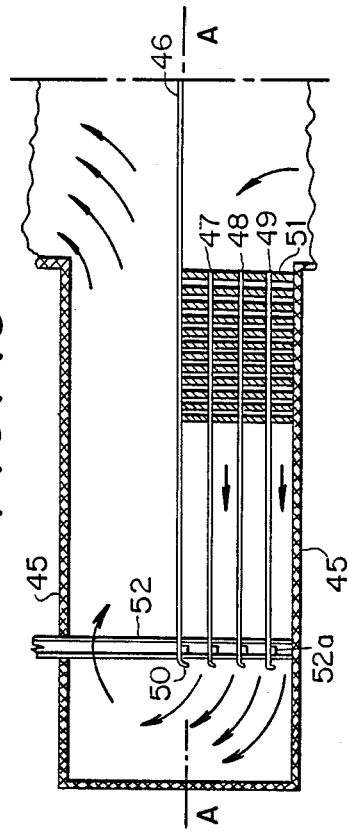
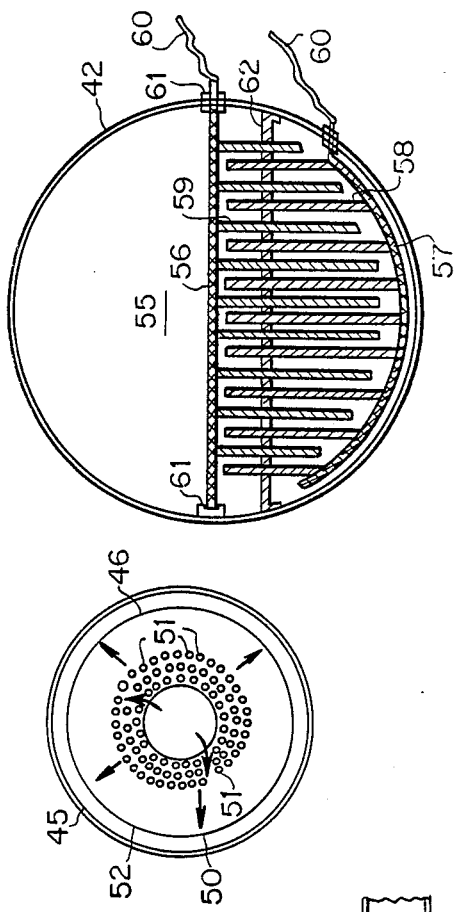
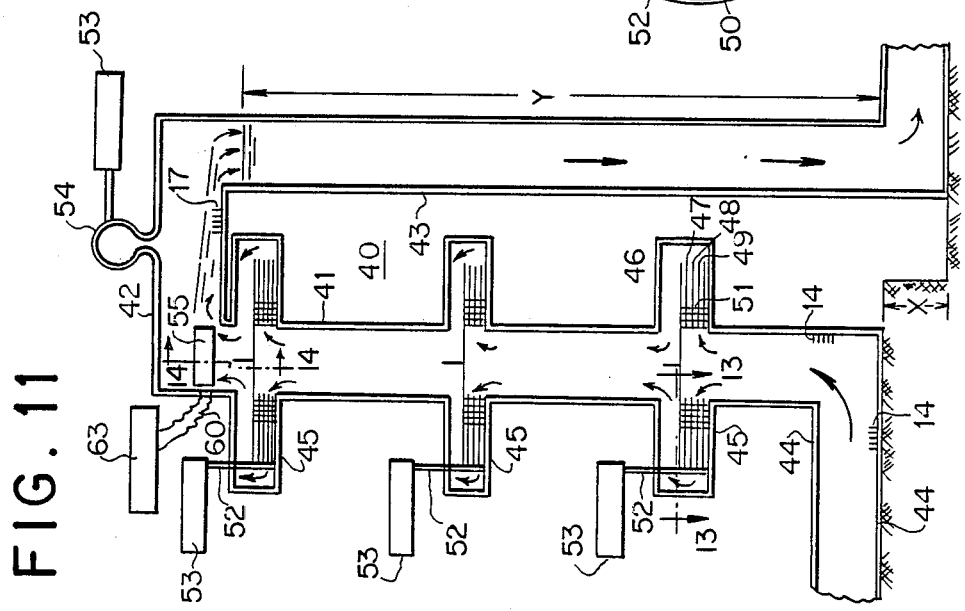

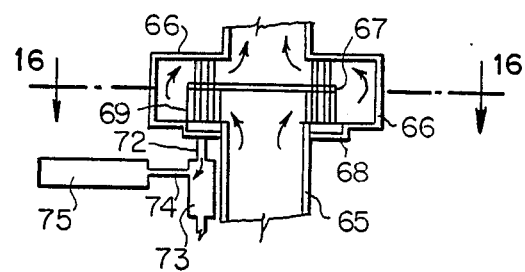
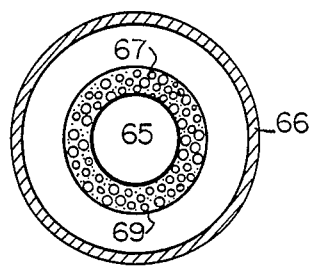
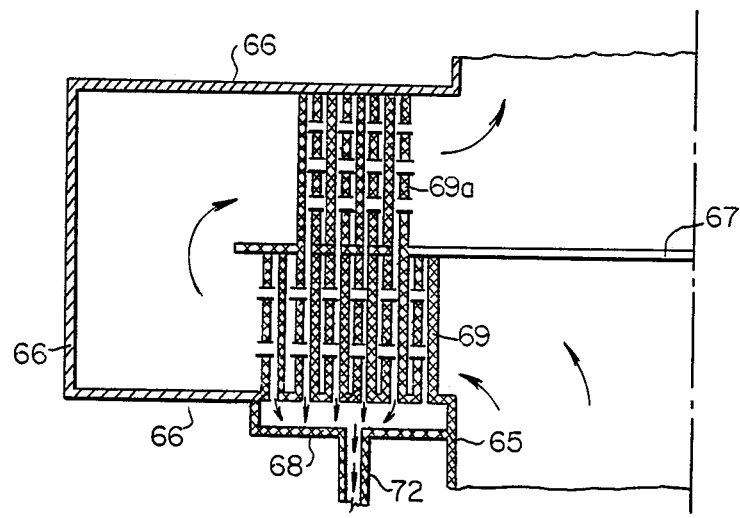
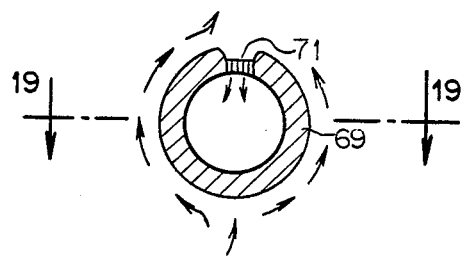
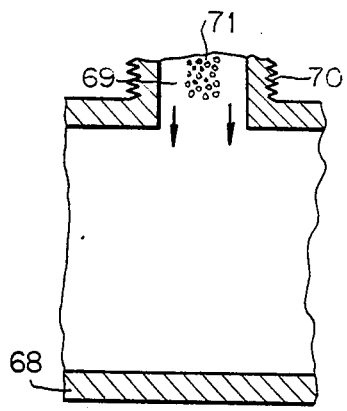

RECOVERY OF GASES FROM NON-VISCOUS SOLVENTS

The invention relates to the recovery of gases and vapors from non-viscous solvents in which they are dissolved. It is applicable for the recovery of sulphur dioxide dissolved in the water of condensation of flue gases. Likewise it is applicable to recovery of volatile substances from ground water contaminated by trace amounts of chemicals making it unfit for drinking water.

Seepage into the ground water from wastefill dump sites, degreasing operations, underground gasoline storage tanks or chemical or metallurgical operations have necessitated a national effort to clean up contaminated water and particularly because carcinogens and poisonous substances in trace amounts can now be accurately measured therein.

Active carbon has long been known to adsorb trace amounts of such ground water pollutants and water containing larger amounts may be aerated prior to travel through activated charcoal beds to lessen the amount of charcoal needed for purification. However, aeration wastes the contaminants by releasing them into the atmosphere thus polluting it and allowing rain or dew to return the contaminants to the groundwater. It prevents recovery and reuse of valuable chemicals.

My copending patent application entitled, "Recovery of Gas Dissolved in Flue Condensate", Ser. No. 743,137 filed June 10, 1985 discloses a method for the recovery by vacuum means and apparatus whereby a volatile material may be separated very economically from a liquid in which it is dissolved and in a large scale operation.

SUMMARY OF THE INVENTION

This invention discloses that under vacuum treatment of groundwater or river water, the air dissolved therein is or can be made sufficient to purge or strip the unwanted volatile contaminants therein which now make it unfit for drinking water. That is, the phenomena making separation possible by difference of relative vapor pressure of water and a more volatile component dissolved therein in trace amounts, is supplemented by the stripping effect of nitrogen and oxygen as these are evolved under higher and higher vacuum. The combined effect results in lower parts per billion of dangerous water contaminants so that further treatment with activated charcoal is reduced. Furthermore, contaminants like gasoline are easily separated from ground water as disclosed by this invention. Where any contaminant in the water causes frothing under vacuum, it has long been known that additions of small amounts of powdered charcoal prior to vacuum treatment prevents frothing to the extent it affects smooth operation.

Secondly, this invention discloses a radically new method and apparatus for the selective separation of substances which are more volatile than the water in which they are dissolved and more broadly the selective separation of substances from a less volatile solvent in which they are dissolved. This is achieved by drawing the solvent upwardly in a vertical or slanting rectangular conduit or tube by vacuum imposed at the top thereof and separately removing at various levels in the rectangular conduit or tube the bubbles of the various dissolved volatile substances specifically released at those levels below atmospheric pressure. Collection of the bubbles at any certain level is achieved by the combined forces of vacuum and centripetal force creating the bubble and bringing them to gas off-take points along the rectangular conduit or tube via grooves, guide vanes, cavitational channels or pipes.

The centripetal effect adds to the partial vacuum effect in creating bubbles of the most volatile trace elements near the bottom of the conduit or tube. It is created in this invention by rows of closely spaced small tubes or rods which are generally vertical. These tubes or rods momentarily increase the water velocity by obstructing its path and likewise cause the water to whirl around their center lines. Whereas cavitation becomes a limiting problem in the design of turbine blades and screw propellers when its force exceeds the vapor pressure of water, this invention takes advantage of this natural phenomena to withdraw bubbles of volatiles which have a higher vapor pressure than water or, more broadly, from a solvent other than water. The path of the solvent moving swiftly around any small pipe obstructing its path brings centripetal force into action drawing the bubbles towards the pipe face so that they can enter the pipe interior via a split in the pipe length opposite the flow of the solvent.

This invention teaches that it is more economical to remove the more volatile substances separately since much less horsepower is required in the vacuum pump at the top of the tower than when these are allowed to expand to say, 10 mm Hg instead being removed at spaced intervals as herein disclosed.

Providing a vacuum leg is attached to the upper end of the conduit and leads downward from there to a level below that of the entrance to the conduit sufficient to overcome friction of flow of the water, a syphon is created so no power to move is needed for the apparatus. But a vacuum pump is necessary both to start operation and to remove and force the offtake gases or vapors through cooling and condensation apparatus so these may constitute valuable byproducts instead of harmful pollutants in the atmosphere from whence they are returned to ground water by dew and rain.

The outside surfaces of solid or hollow rods are preferably such that they are not "wet" by water when it is the solvent. This promotes the cavitational effect wherein a vacuum is created and volatiles evaporate to fill it or make small bubbles. Likewise the rod surface and that of the conduit may have a rough surface with spines or particles attached thereon to create an enormous multiplicity of cavitational effects and tiny bubbles of volatiles. Thereby this invention provides a less expensive separation method than aeration and some forms of distillation.

BRIEF DESCRIPTION OF THE DRAWINGS

Reference will hereinafter be made to the accompanying drawings in which.

Figure 5:
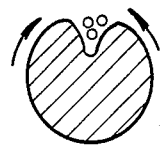

FIG. 5 is a horizontal cross-section of a solid rod with an indentation along its length portion that forces downstream allowing for bubble rise therealong in a horizontal flow of water.

Figure 6:
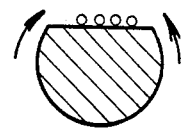

FIG. 6 is a horizontal cross-section through a solid rod flattened along its length that faces downstream to allow bubble rise therealong in the space caused by cavitation.

Figure 7:
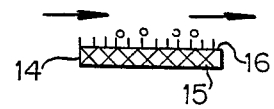

FIG. 7 is a vertical cross-section through a mat having bubble-forming spines for lining water conduits of the invention.

Figure 8:
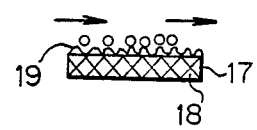

FIG. 8 is a vertical cross-section through a mat having partially embedded bubble-forming catalysts for lining water conduits of the invention.

Figure 9:
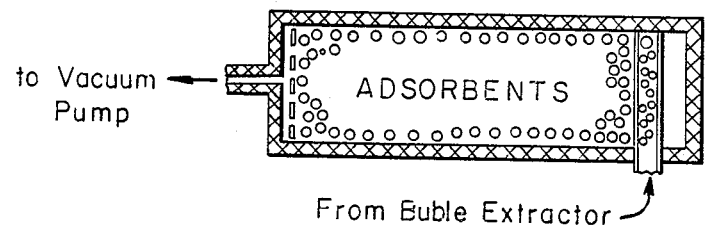

FIG. 9 is a vertical cross-section through an apparatus of the invention to adsorb volatiles from bubble extractors.

Figure 10:
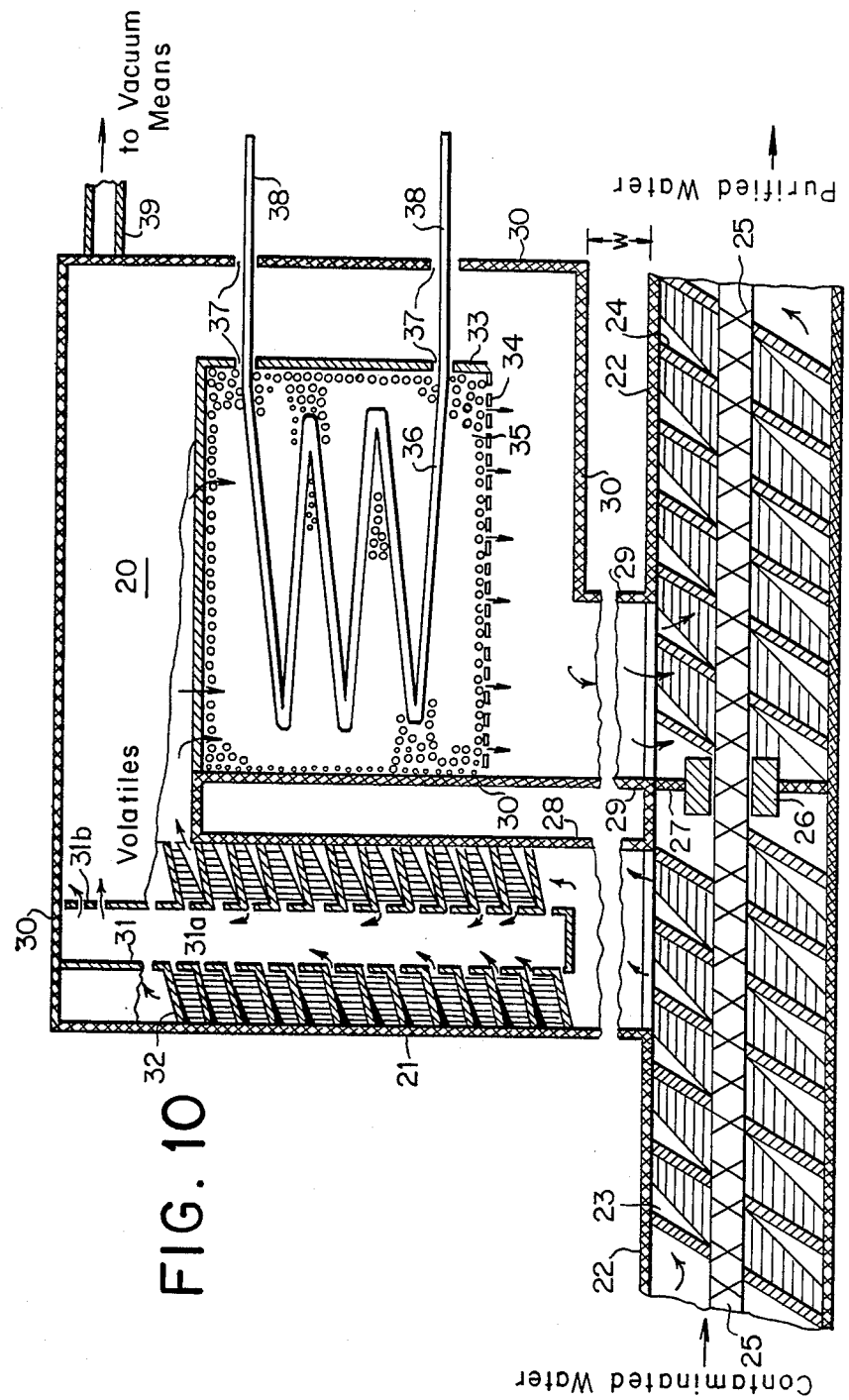

FIG. 10 is a vertical cross-section through a syphon of the invention wherein the water travels rapidly spirally upward around a small central tube into which volatiles are centripitally ejected.

FIG. 11 is a vertical cross-section through a syphon of the invention in which there are annular appendages along a vertical, typically generally cylindrical, conduit permitting horizontal, radial flow outwardly made momentarily rapid through closely spaced rods obstructing flow.

FIG. 12 is a horizontal cross-section taken through the tops of the rods of FIG. 11.

FIG. 13 is the left half part of a vertical cross-section through an enlarged annular appendage of FIG. 11.

FIG. 14 is a vertical cross-section through an electrolytic decomposition unit near the top of the syphon of FIG. 11.

FIG. 15 is a vertical cross-section of a vertical intake conduit of a syphon of the invention which has novel improvements.

FIG. 16 is a horizontal cross-section through 16—16 of FIG. 15.

FIG. 17 is an enlarged vertical cross-section of the left half of FIG. 15.

FIG. 18 is a horizontal cross-section through a hollow rod of FIG. 17 enlarged to show details.

FIG. 19 is a vertical cross-section of the base of the rod of FIG. 18 showing likewise a portion of the annular gas and water collection basin of FIG. 17 into which it discharges.

DESCRIPTION OF THE PREFERRED EMBODIMENTS

The process of the invention involves drawing by syphon action supplemented by vacuum extraction the flow of water contaminated with trace amounts of impurities making it unsuitable for human consumption. Obstructions to flow in the form of closely spaced rods, pipes, wires or the like cause cavitation and centripetal forces to release dissolved volatiles in bubble form which need rise only a few inches before reaching one of a multiplicity of horizontal plates to which rods are attached. The water flow carries the bubbles to the end of the horizontal plates where the plates have a downward projection serving to accumulate the volatile and allow its removal through pipes leading to small cooling and vacuum-compressor apparatus. Depending on the volatility of the several principal impurities present, the obstructions creates bubbles at several levels in the height of the syphon tower and thus at several degrees of decreasing absolute pressure. This not only allows impurities of different volatility to be separated but conserves the amount of horsepower needed for extraction. Sometimes ground water is contaminated with substances which ionize in water and hence can not entirely or easily be removed by vacuum plus centripetal action. In this case closely spaced metal or carbon plates or rods at the top of the syphon provide eltrolytic action to break down the ions into volatiles removable at very low absolute pressure.

Figure 2:
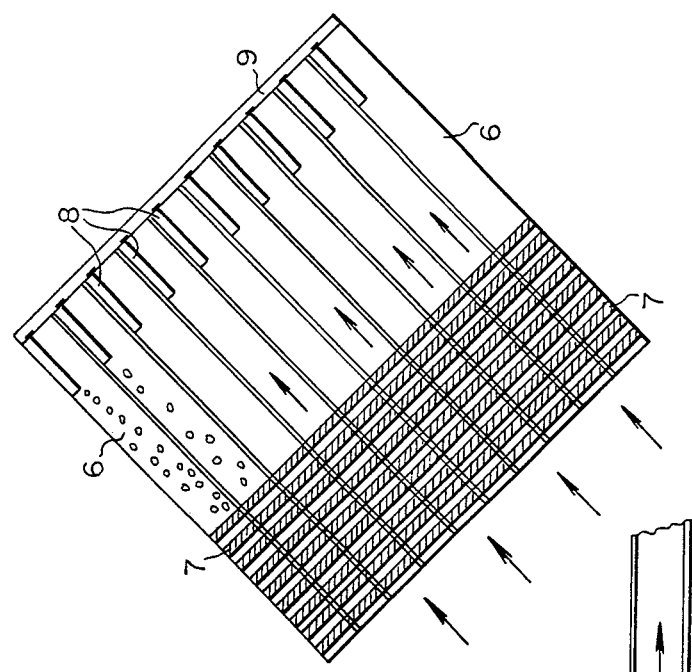
FIG. 2 is an enlarged vertical cross-section through one of three assemblies of plates which divide water flow in the slanting conduit of FIG. 1 into thin streams momentarily obstructed by small rods joining the plates.
Figure 1:
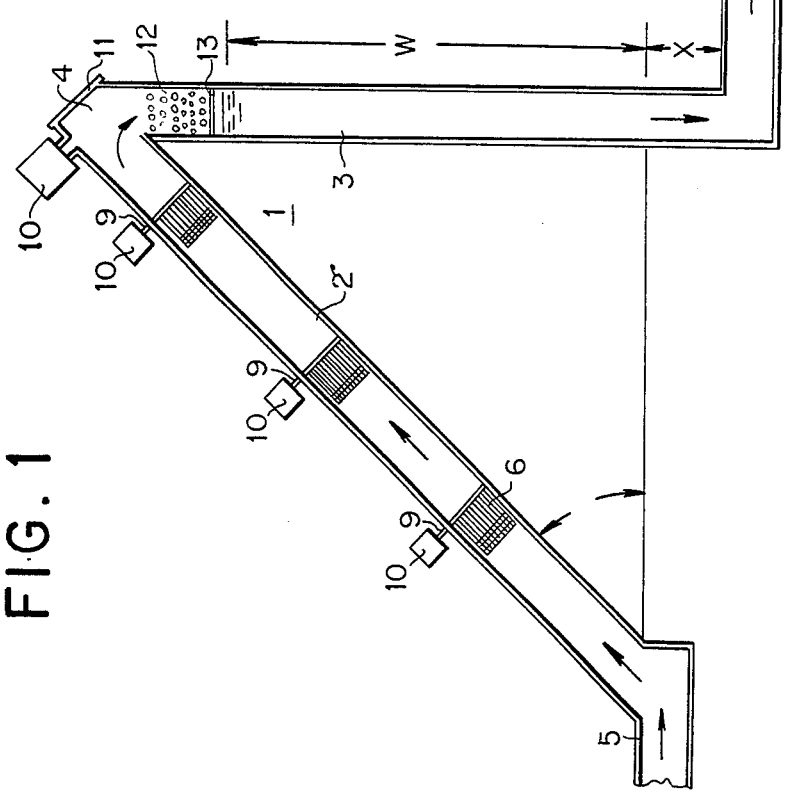
FIG. 1 is a vertical cross-section through a rectangular upwardly slanting conduit joining a vertical vacuum leg in a syphon of the invention.
Figure 3:
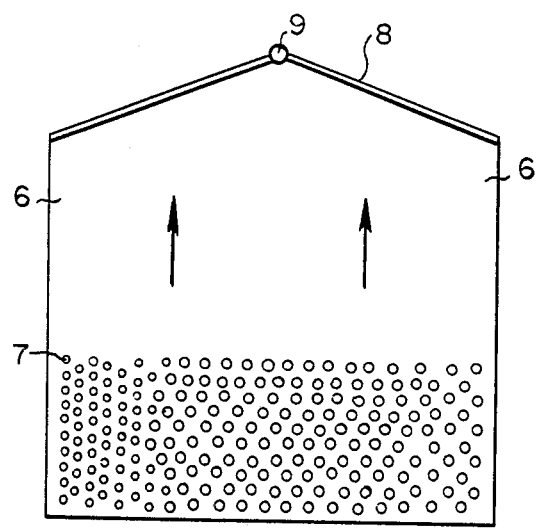
FIG. 3 is a plan view of a plate of FIG. 2 which makes a cross-section through the small rods.

In FIG. 1, which is a vertical cross-section through a syphon of the invention, 1 is the syphon apparatus wherein the vertical dimension X designates the drop in elevation of the water level between incoming and outgoing conduits running almost full of water and dimension W the length of vacuum leg which is about 34 feet at sea level under high vacuum. The drop in elevation X is needed to overcome the friction of the water in passing through and thus maintaining flow up the slanting conduit 2 and overflowing into the vacuum leg conduit 3 which may be either vertical or slanting. The top junction of these conduits 4 is necessarily evacuated to preserve the syphoning effect while the incoming conduit 5 must be full of water to avoid drawing atmospheric air into the flow which would dilute the volatiles to be extracted. The flow of water up the slanting conduit 2 is forced to travel through one or more plate 6 and rod assemblies 7 shown in enlarged form in FIGS. 2 and 3 where it is apparent that dividing the conduit flow into channels only a few inches thick gives bubbles of volatiles, formed by momentary high velocity around the rods, time to rise to the underside of a plate 6 and be guided by downward inclined lip 8 into slots in pipe 9 leading to volatile adsorption apparatus of FIG. 9 which may contain granular activated carbon or other applicable conventional adsorbent or cooling and condensation means assisted by a vacuum pump compressor. Since ground water contaminants are usually present in only parts per billion, these may be diluted by perhaps 100 parts of air per part of volatile contaminant so connection to an evacuating means will usually be required.

The process of this invention is opposite to that of conventional continuous separation by distillation in stages wherein each stage will have a volatile condensing as well as evaporating from a solvent and at a certain equilibrium rate. In contrast this invention removes a volatile bubble by centripetal action in a fraction of a second and thereafter uses all means possible to keep the bubble from redissolving in the solvent. Very small bubbles have more tendency to redissolve and rise much slower er than large bubbles, which, at a size of 1.5 millimeters diameter in cool water may rise faster than 0.6 ft/sec. This explains the necessity of subdividing a conduit carrying solvent with plates 6 and downward incline lip 8 and pipe 9 to collect and coalesce bubbles into a gas and remove it before it is redissolved in the solvent.

Any shape immersed in water is buoyed up by the weight of water displaced. Similarly this invention teaches that a bubble of gas is driven radially inward around a small rod by centripetal force in proportion to the water it displaces. In designing apparatus to utilize this invention, it is useful to calculate the relative amount of horizontal centripetal component to the vertical (weight of displaced water) component lifting the bubble. The following calculations illustrate the method.

EXAMPLE NO. 1

In the formula
$F = W V^2/g R$

Figure 4:
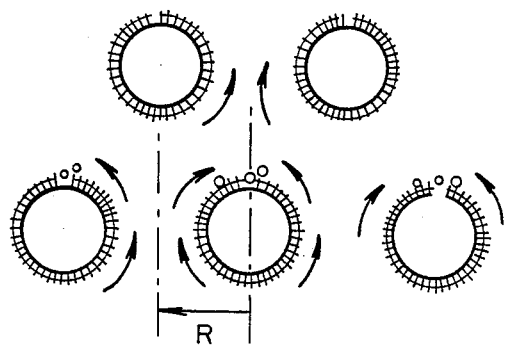
FIG. 4 is an enlarged horizontal cross-section of two different patterns of slotted, hollow of rods of FIG. 3 comparing radii of gyration of water swirls around rods.

F = force in lbs
W = weight in lbs of ring of water rotating or any segment part thereof
V = velocity of water in ft/sec
g = acceleration of gravity = 32.16
R = radius of gyration in ft which in FIG. 4 is half distance between rods

|  |  | Case I | Case II |
|---|---|---|---|
| Velocity of water in conduit miles/hour 4.09 |  | 2.04 |  |
| Flow speed around rods (50% flow area taken by rods) | ft/sec | 3 | 6 |
|  | ft/sec | 6 | 12 |
|  | $V^2$ | 36 | 144 |
| Radius of gyration (0.5 ins) in ft |  | 0.0417 | 0.0417 |
| Centripetal force in lbs ($WV^2/g^R$) |  | W × 27 | W × 108 |

Thus in case I with a conduit flowing about two miles per hour around rods 0.5 inch diameter and with rods spaced about one inch between centers the force acting on a bubble (of any size) is 27 times greater forcing it radially inward that the force lifting it vertically upward by gravity; and in Case II 108 times greater when the flow is about 4 miles per hour. As the bubble draws closer to a rod the force increases proportionately. Tiny bubbles caused by spines on a rod are drawn into the rear of the rod to coalesce. Shapes of rods having areas for the bubbles to coalesce are shown in FIGS. 5 & 6. Alternatively, slotted hollow rod as shown in FIG. 4 may be used.

As regards the practical utility of the invention, a conduit 2 ft by 4 ft flowing about 2 miles per hour through a gravity-maintained syphon of the invention will deliver 124 million gallons of water per day sufficient for about 826,000 people on the basis of 150 gal/person/day.

Table I below shows some of the characteristics of the substances found in ground water usually in quantities only of parts per billion rather than million which latter would be very dangerous for municipal use. These are arranged according to increasing partition coefficient which is generally in proportion to lesser volatility but greater solubility in water.

illustrated in FIG. 10 which not only volatizes impurities but therefore adsorbes in activated charcoal those not entirely removed by volatilization. Likewise means are provided for reactivating the charcoal without removing it from the bed. FIG. 10 is a vertical cross-section view of a vertical bubble extraction tower attached to a vacuum leg with vacuum means at the point of attachment and in this respect similar to the apparatus of FIG. 1 and FIG. 11. However, in FIG. 10 the incoming water is fed under pressure so advantage is taken of this to operate a screw propeller pump feed into the bottom of the bubble extraction tube having a common spindle with a screw propeller pump which extracts the purified water from the vacuum leg assuring a smooth flow of contaminated water into the apparatus and purified water out of the apparatus.

In FIG. 10, 20 is the water purification apparatus wherein 21 is a vertical tube an inch or several inches in diameter but preferably small to derive centrifugal effects on the water made to spiral upward therein. Contaminated water is supplied to the vertical tube 21 by the horizontal tube 22 which likewise extracts water from the vertical vacuum leg. Rotating spiral flights 23 feed water in and flights 24 feed purified water out with both sets of flight being attached to a common spindle 25 which turns in the water-lubricated bearing block 26 set in the pipe divider 27. The vertical tower as a whole, 28 is made of the steel tube 21 and a smaller tube 31 with attached spiral vanes 32 welded to tube 31 so the contaminated water is made to follow a spiral raceway upwardly but only in the uppermost several feet since usually the lower 25 feet need no spiral raceway to extract all volatiles present since the contaminated water in the uppermost three feet is, perhaps, only at 1.5 lbs/sq. inch atmospheric pressure or less compared to 14.7 psi if at sea level. This partial vacuum plus centripetal force cause the volatiles to exit as bubbles at the aperatures 31a to the inside of pipe 31 from whence they exit at aperatures into the box-like structure enclosed by wall 30 and hence to vacuum means via vapor outlet pipe 39. Not all the impurities in the water may volatilize even under vacuum so the water is guided into the enclosure 33 having a screen bottom 34 and filled with activated carbon 35. At periods of a month or year when the activated carbon is saturated with impurities, the water is turned off and carbon reactivated by electrically heating it with the nichrome resis-

TABLE I

|  | Partition[xx] Coefficient water/air w/v per w/v | Solubility in water @ 68 F. parts/10^6 w/w | Vapor pressure @ 68 F. lbs/sq in | Boiling point deg. F. |
|---|---|---|---|---|
| 1 vinyl chloride | 0.02 @ 50 F. | 60[x] | 44.9 | 10 |
| 2 fluortrichloromethane | 0.03 | 1100 | 12.9 | 75 |
| 3 difluordichloromethane | 0.06 | 280[x] | 83.3 | −21.6 |
| 4 vinylidene chloride | 0.16 | 400 | 9.6 | 89.4 |
| 5 1,1,1,-trichloroethane | 0.71 | 480 | 1.86 | 165.1 |
| 6 hexachlorobutadiene | 0.97 | ~2 | 0.002 | 418 |
| 7 carbon tetrachloride | 1.17 | 785 | 1.74 | 170.4 |
| 8 perchloroethylene | 1.22 | 150 | 0.27 | 250 |
| 9 trichloroethylene | 2.74 | 1100 | 1.12 | 188.6 |
| 10 methyl chloride | 3.3 | 7250[x] | 72.6 | −7 |
| 11 methylene chloride | 8.1 | 13200 @ 51 F. | 7 | 104.2 |
| 12 chloroform | 12 | 8200 | 2.9 | 142.4 |
| 13 ethylenedichloride | 26.4 | 8800 | 1.23 | 181.2 |
| Compare with the above values for water are |  |  | 0.34 | 212 |

The foregoing text describes how the invention may be practiced to handle quantities of water sufficient for cities. Smaller quantities of water needing purification for factories, offices or dwellings may use the apparatus tance wire coil 36 which is electrically insulated from metal walls by gas-tight insulators on the cool lead-in conductors 38. After the above treatment the purified water exits downward through screen 34 into vacuum leg 29 which is kept partly full even though the spiral pump vanes 24 tend to empty it.

Those familiar with the art know it takes more energy to maintain 90–95% vacuum than 85–90% vacuum. The assist of centripetal force to reach higher extraction rates under vacuum can be applied in the vacuum distillation field. Likewise reactivation of carbon under vacuum prevents oxidation of carbon.

The separating effect in the above described apparatus illustrated in FIG. 10 is computed below in EXAMPLE No. 2.

EXAMPLE NO. 2

Water in a household flows at the rate of 3 gallons/min or 10.35 cu ins/sec through the spiral cross-section of FIG. 10 measuring 0.2 ins high and 0.45 ins wide or 0.09 sq ins along 115 ins/sec or 9.59 ft/sec In the Formula $F = \frac{WV^2}{gR}$ $$F = \frac{W(9.59)^2}{32.2 \times 0.058}$$

$$= W \times 49$$

F = centripetal force in lbs
W = weight of ring of water rotating or any segment part thereof
g = acceleration of gravity = 32.2
R = radius of gyration of water which is radius of outside ring = 0.7 ins or 0.058 ft Thus the centripetal force on a bubble moving it radially towards the central tube to be expelled is 49 times that to make it float.

Air dissolved in water at sea level averages about 21 parts per million while badly contaminated water might be only 200 parts per billion so there would be perhaps 100 parts of air to each part of volatile to tend to strip out volatiles. In the above example the water flow of 10.35 cu in/sec would yield;

$$\frac{10.35 \times 60 \times 62.4 \times 21}{1728 \text{ cu in/cu ft} \times 0.0808} \text{ ppm} \times$$

$$\frac{100 \text{ (to assure vacuum)}}{\text{lb/cu ft air}} = 0.58 \text{ cu ft/min}$$

Thus only a very small vacuum pump would be required when the water was running.

FIG. 11 is a vertical cross section through a syphon of the invention in which there are annular appendages along a vertical, cylindrical conduit permitting radial flow outwardly made momentarily rapid through closely spaced rods obstructing flow. The great advantage of this design is that flowing radially outward slows the velocity of flow after passage through the rods and this affords time for bubbles to rise and be recovered as better shown in FIG. 12 and FIG. 13.

FIG. 12 is a horizontal cross-section taken through the tops of the rods of FIG. 11.

FIG. 13 is an enlarged view of the left half of one of the annular appendages of FIG. 11.

In the above Figs., 40 is the syphon apparatus wherein 41 is the vertical cylindrical input conduit, 42 is the horizontal, evacuated conduit joining the top of 41 with the top of 43 which constitutes the vacuum leg Y sufficient to preserve the syphon effect with vacuum means attached to 42.

The intake conduit 44 is assumed to run level full of the water requiring impurity removal, and the distance X represents that necessary to overcome friction of flow through the entire syphon apparatus 42. As the water rises from 44 into the vertical tube 41 it is forced to flow through each of the successive horizontal appendages 45 by disc-shaped plate 46 which directs the flow radially outwardly and then allows it to flow inwardly to 41 and thence upwardly again. The disc 46 is attached to the annular plates 47, 48 and 49 by a multiplicity of rods 51 which thereby divide the radial outward flow of water into four layers only a few inches or less thick as it is subjected to the cavitation action of the rods whose cross-sections may be like those shown in FIG. 4, 5 and 6. The bubbles of volatiles arising from this cavitation rise until caught on the bottom of plates 46, 47, 48 and 49 and carried outwardly by the flow until caught by the downwardly disposed lip or rim 50 where bubble coalescence permits gas or vapor to be withdrawn into pipe 52 via aperatures 52a and thence to conventional vapor condensation or adsorption means 53 illustrated in FIG. 9. At the top of the syphon tube 42 the vacuum compressor 54 keeps the syphon in operation and cools, condenses or adsorbs any remaining volatiles in 53 attached to 54.

Extraction of unwanted impurities within 42 is enhanced by the electrolytic apparatus 55 whereby ionic substances which are not volatile can be decomposed by electrolytic action into gases or harmless products. In FIG. 14, which is a line 14—14 of FIG. 11 cross-section through 42 at A, an upper support 56 delivers electric current to electrodes 59 while a lower support 57 delivers current to electrodes 58. These electrodes may be either rods or plates of carbon or graphite or metals such as iron alloys or even silver if bactericidal action is needed. Current from generator 63 is delivered to 56 via current lead 60 while the other lead 60 delivers current to lower, curved electrode support 57 which, like the upper support 56, is electrically insulated by insulators 61 which for leads 60, make water and gas-proof seals in cylindrical tube 42. Plates are separated by segmented insulators 62. To avoid polarization of metal electrodes means for periodic current reversal is provided in the generator 63. Likewise bubble formation of unwanted volatiles may be enhanced by fiber mats 14 and 17 lining some parts of the conduit inner surfaces having spines as in FIG. 7 or catalyst particles as in FIG. 8. The tiny bubbles formed in this way grow very rapidly under high vacuum and hence rise faster without being redissolved. The spines on the hollow rods or tubes of FIG. 4 are most effective since the tiny bubbles are removed instantly by entrance into the thin crack which constitutes the end to end split of the pipes of FIG. 4. Water can be prevented from entering by making the tubes out of plastic materials not wet by water or coating metal pipes with such inside and outside. Upward leading passages in the pipes of FIG. 4 or those of 9 in FIGS. 1, 2 and 3 and 52 of FIGS. 11, 12 and 13 need to be open if a large volume of gas is being evolved which is the case as lower absolute pressures are reached.

To assure that the bubbles enter the tubes and that water does not stop them up the more compact design illustrated in FIGS. 15 to 19 inclusive was devised. It eliminates the need to divide the main downstream to catch the bubbles so allows each appendage to be much smaller in radius than shown in designs of FIGS. 1-3 inclusive and FIGS. 11-13 inclusive. Likewise by the use of novel hollow rods or tubes it remarkably increases cavitation in water or other non-viscous solvent so expedites extraction of dissolved volatiles. Lastly, by coalescing bubbles and drawing the resulting gas downwardly inside hollow rods to water removal and gas condensation means, no opportunity remains for bubbles to redissolve in the solvent Consequently this fast physical process resembles a chemical reaction wherein one product is removed from the reaction as fast as formed.

FIG. 17 is an enlarged vertical cross-section of the left half of the syphon intake leg shown in vertical cross-section as 15 and shown in horizontal cross-section in FIG. 16.

In these drawings 65 is the syphon tube intake carrying water upwardly until the flow is forced to flow first radially outwardly and then inwardly by the horizontal circular plate 67 held in place by the hollow vertical tubes 69 and 69a between and around which the flow passes at right angles, i.e. horizontally. The 69a tubes merely illustrates that this compact design allows tubes to be twice the length shown in FIGS. 11 and 13. The volatile gas and any entrained moisture moves downwardly through each tube and into the annular collection basin 68 and thence via pipe 72 to water removal means 73 and finally to gas condensation means 75 such as illustrated in FIG. 9. FIG. 17 has fewer of type 69a tubes than 69 merely to emphasize flow travel substantially horizontal is preferred.

FIGS. 18 and 19 illustrate two important novel features of the invention. FIG. 18 is an enlarged vertical cross-section of a 69 or 69a tube in which downstream perforations 71 are visible. These perforations are small enough so gas but not solvent will pass inside the tube. The entire length of a tube is perforated over the indented or flattened area where cavitation occurs. Size of the perforations depend on the material used to make the tube and the solvent being treated which preferable does not "wet" the tube surface. There are hard plastics which are not "wet" by water. Under proper operating conditions cavitation occurs over the perforated area so volatiles evaporating to fill this vacuum contain only entrained solvent droplets. Such cavitation is greatly increased by the novel grooves or threads 70 on the circular surface of a rod illustrated in FIG. 19 by a vertical cross-section of the base of the rod on line 19—19 and facing downstream. Such grooves or threads forcibly subdivide the flowstream at high velocity so a multiplicity of Z-shaped cavitations are opened along the dowstream surface of the half of the tube where the perforations are located. The phenomena disclosed by this invention is easily demonstrable by placing a partly threaded bolt under the flow of a water faucet and comparing degree of cavitation following smooth and grooved portions. The increased area of flowstream exposed to the vacuum of cavitation allows more volatiles to be evaporated and removed via the perforations 71 without bubbles being formed.

A conduit flowing full on the surface of the ground at atmospheric pressure and provided with the above described rods 69 in FIGS. 17, 18 and 18 must release most of an dissolved volatiles if horizontal velocity of flow is increased sufficiently to cause cavitation. This is the ultimate in simplicity of this invention. However, reducing atmospheric pressure on a solvent as it flows upwardly to the top of an evacuated syphon top make the degree of vacuum attained by cavitation greater and hence extraction of dissolved volatiles more complete.

The invention may advantageously replace some forms of distillation of non-viscous petroleum and chemicals where the processes depend on bubble tray towers in a diffusional process where at each one of multiple steps an equilibrium must exist between volatile evaporating and condensing.

Vacuum evaporation of fruit juices without heating is facilitated.

The process is valuable in more completely recovering sulphur dioxide from the water of condensation of flue gases mentioned previously.

Likewise it can lower capital and operating costs of boiler feedwater deaeration where it consists of trickling water over a stack of metal trays where steam is used to sweep out the uncondensable gases.

In order to construct an apparatus to practice this invention on a production basis to extract various substances separately in a flow-stream, the following considerations should be taken into account:

(a) the number of patterns of shaped obstructions to be used and the sequence of kinds of shapes therein, in order to separately remove each of the substances;

(b) the degree of vacuum best suited to remove each substance separately and in the quantity it is present in the solvent;

(c) the momentary velocity of travel of the solvent around the shaped obstructions which involves the closeness of these with each other and with walls, or otherwise stated, the spacing of the shapes;

(d) the type of shape; that is, whether cylindrical or wedge shaped, solid or hollow, covered with spines or catalyst particles, larger at top of the flow than at the base to allow gas escape upwardly, or larger at bottom than at top to allow gas escape downwardly, whether flattened or indented on the downstream face if a rod, and what diameter and whether grooved, and how deeply;

(e) the type of device for coalescing any bubbles formed into gas for withdrawal with minimum entrained water which involves perforated media, thin openings and the like treated with an agent which will not be wet under the conditions prevailing at point of withdrawal of the specific volatile being extracted; for example, a rosin amine or the like classified as anionic, cationic, nonionic or mixed;

(f) the composition of the shapes, such as different metals and graphite reacting electrolytically;

(g) the sequence of the above highly specific patterns in order to recover the quantities and purities of the different substances dissolved along the same flow-stream;

(h) sonic or ultrasonic vibration to induce bubble formation;

(i) warming the flow-stream to make the solvent non-viscous and hence amenable to this process;

(j) electrolytic current applied at high vacuum to destroy bacteria or minute plant life later removed settling ponds or the like separation devices;

(k) the degree of pressure higher than atmospheric pressure which can easily be achieved by making a downward loop of the conduit prior to the upward loop which latter constitutes a syphon; at any given velocity of flow and pattern of obstacles to that flow at a pressure higher than atmospheric pressure, the size of cavitation pockets from which a volatile may be withdrawn will be smaller, but the gas will be above atmospheric pressure, so will not need a vacuum means for withdrawal; likewise, in some cases, an added means of separation of volatiles is afforded; (the apparatus of FIG. 11 is applicable for this case with the solvent in conduit 44 entering at a pressure above atmospheric and as many stages more or less than the four illustrated used as necessary to separate the volatiles in the solvent in the patterns above and below atmospheric).

I claim:

1. The process of continuously separating a more volatile substance from a non-viscous liquid in which it is dissolved comprising:
   (a) flowing the liquid through a vertical conduit having portions extending radially outwardly and radially inwardly, the portions extending radially outwardly each having a pattern of shaped, spaced obstructions disposed therein, said flow being controlled to take place at a sufficient velocity to cause bubbles of said volatile substance to form due to centripetal separating force caused by flowstream curvature around the shaped obstructions; and
   (b) continuously removing the bubbles of the volatile substance from the nonviscous liquid before they redissolve in the liquid.

2. The process according to claim 1 comprising the further steps of:
   (a) causing the bubbles to coalesce beneath a surface to form a gas stream; and
   (b) withdrawing the gas stream from the liquid flowstream in a separate conduit.

3. The process according to claim 2 wherein said process is conducted under subatmospheric pressure.

4. The process of claim 3 in which the flow stream moves through plural patterns of shaped spaced obstructions each at a successively lower absolute pressures.

5. The process according to claim 4 in which the solution contains plural volatile impurities and a partial separation of volatile impurities from one another is obtained by subjecting the flow stream at different absolute pressures at differing locations.

6. The process according to claim 5 in which the flow stream flows through a syphon to which vacuum is applied at a point above its highest level.

7. The process according to claim 6 in which the elevation of the outflowing conduit is located vertically with respect to the imcoming conduit such that continuous syphon flow occurs.

8. The method of claim 1 wherein said shaped obstructions are rods extending into the flow path of the liquid.

9. The method of claim 8, wherein said rods have a number of grooves formed thereon to further promote cavitation and bubble formation.

10. The method of claim 9, wherein said grooves are formed on said rods essentially by formation of a screw thread thereon.

11. An apparatus for separating volatile impurities from a solvent containing said impurities comprising:
   (a) a syphon for syphoning the solvent upward from an inlet into a conduit so as to flow upwardly along a flow path to a top point, at which point the solvent is at a pressure substantially below atmospheric pressure, and thence downwardly along a vacuum leg;
   (b) vacuum means located near said top point for initial commencing of the syphoning and to maintain the pressure at said top point substantially below atmospheric pressure;
   (c) a plurality of obstruction means in the flow path in the upflow leg prior to said top point of said syphon conduit means for partially obstructing the flow to cause cavitation of said flow, whereby bubbles of said volatile impurities are formed; and
   (d) means for collecting and removing said bubbles of said volatile impurities which are formed upon said cavitation.

12. The apparatus according to claim 11 wherein:
   (a) said obstruction means is a plurality of small rods mounted in spaced positions in said flow path.

13. The apparatus of claim 12 wherein a number of grooves are formed on and extending around the rods, to further promote cavitation and bubble formation.

14. The apparatus of claim 13, wherein said grooves are essentially formed by formation of a screw thread on said rods.

15. The apparatus according to claim 12 wherein said rods are arranged at several successive vertical levels in the syphon upflowing branch, each level being provided with vacuum means to separately collect bubbles of differing ones of said volatile impurities collected at said levels.

16. The apparatus according to claim 15 wherein:
   (a) each said successive level comprises an annular appendage extending outwardly from a vertical upflow conduit, having means to direct the flow in each appendage first radially outwardly between and around a plurality of said rods, thence upwardly, near the appendage perimeter, and thence radially inwardly to the confines of said upflow conduit, and thence upwardly.

17. The apparatus according to claim 16 wherein:
   (a) the appendage portion in which rods are located comprises an annular floor plate and an annular ceiling plate, between which plates the ends of said rods are connected, and a downward projecting rim disposed around the periphery of the ceiling plate, for collecting bubbles of the volatile impurities, and an upwardly extending pipe for withdrawing these volatile impurities from within said appendage to a vacuum means.

18. The apparatus according to claim 17 in which the space between the annular floor plate and annular ceiling plate is subdivided into parallel horizontally extending spaces each a few inches thick by successive ceilings through which ceilings said rods pass and to which said rods are tightly connected, and wherein a downward projecting rim is provided on each of said ceilings to which an upward inclined pipe for withdrawing volatile impurities is connected.

19. An apparatus for separating volatile impurities from water in which said impurities are dissolved comprising:
   (a) a syphon conduit comprising an upflow leg and a vacuum leg defining a flow path for said water, said flow path extending up said upflow leg and down said vacuum leg said flow path including a top point near a connection of said upflow leg and said down flow leg;
   (b) means for defining an airspace above the surface of said water in the vicinity of said top point;

(c) a plurality of cavitation causing partial obstructions disposed in said upflow leg to cause cavitation of said water as it flows upwardly in said upflow leg, to thereby free volatile impurities to form bubbles; and (d) vacuum means communicating with said airspace in the vicinity of said top point to maintain the pressure over the water at said top point below atmospheric pressure as water flows up said upflow leg and down said vacuum leg, in order to remove volatile impurities freed by said cavitation.

* * * * *